(12) United States Patent
Yerli

(10) Patent No.: US 11,650,719 B2
(45) Date of Patent: May 16, 2023

(54) VIRTUAL CREATION OF REAL-WORLD PROJECTS

(71) Applicant: THE CALANY HOLDINGS S. À R.L., Luxembourg (LU)

(72) Inventor: Cevat Yerli, Frankfurt am Main (DE)

(73) Assignee: THE CALANY HOLDING S.À.R.L., Luxembourg (LU)

( * ) Notice: Subject to any disclaimer, the term of this patent is extended or adjusted under 35 U.S.C. 154(b) by 0 days.

(21) Appl. No.: 16/904,112

(22) Filed: Jun. 17, 2020

(65) Prior Publication Data

US 2020/0401284 A1 Dec. 24, 2020

Related U.S. Application Data

(60) Provisional application No. 62/863,105, filed on Jun. 18, 2019.

(51) Int. Cl.
*G06F 17/00* (2019.01)
*G06F 3/0484* (2022.01)
*G06T 19/20* (2011.01)

(52) U.S. Cl.
CPC .......... *G06F 3/0484* (2013.01); *G06T 19/20* (2013.01); *G06T 2219/024* (2013.01); *G06T 2219/2004* (2013.01)

(58) Field of Classification Search
None
See application file for complete search history.

(56) References Cited

U.S. PATENT DOCUMENTS 6,091,422 A * 7/2000 Ouaknine ............... G06T 19/00
345/419
9,721,386 B1 8/2017 Worley, III et al.
(Continued)

FOREIGN PATENT DOCUMENTS

CN 107885326 A 4/2018
EP 3232346 A1 10/2017
(Continued)

OTHER PUBLICATIONS

Extended European Search Report dated Oct. 27, 2020, issued in European Application No. 20180814.4, 9 pages.
(Continued)

*Primary Examiner* — Mustafa A Amin
(74) *Attorney, Agent, or Firm* — Christensen O'Connor Johnson Kindness PLLC

(57) ABSTRACT

A system and method for providing a virtual collaborative creation of real-world projects. The system comprises a server configured to store and process input data, the server comprising a memory and a processor, wherein the memory further comprises a database with structured data storing virtual replicas of real-world elements forming a virtual world system, and wherein the processor is configured to execute data and instructions stored in the memory. A plurality of devices connect the server via a network, each device comprising sensing mechanisms configured to capture multi-source data from real-world elements that serve to enrich and synchronize the virtual replicas with corresponding real-world elements. Collaborative platforms stored in the memory and accessed via user devices enable the creation, tender offering, and administrative reviewing and approval or rejection of real-world projects. Methods thereof are also described.

15 Claims, 10 Drawing Sheets

(56) References Cited

U.S. PATENT DOCUMENTS

| | | | |
|---|---|---|---|
| 10,403,050 B1* | 9/2019 | Beall | G02B 27/017 |
| 2003/0083957 A1 | 5/2003 | Olefson | |
| 2006/0010005 A1 | 1/2006 | Rowland | |
| 2008/0243721 A1 | 10/2008 | Joao | |
| 2008/0249756 A1* | 10/2008 | Chaisuparasmikul | G06F 30/20 703/13 |
| 2010/0030804 A1* | 2/2010 | Behrends | G06F 16/273 707/E17.009 |
| 2010/0285877 A1* | 11/2010 | Corazza | A63F 13/52 463/32 |
| 2012/0038667 A1* | 2/2012 | Branson | G09G 5/12 345/632 |
| 2012/0159350 A1* | 6/2012 | Gaume | G06Q 30/02 715/753 |
| 2013/0218542 A1* | 8/2013 | Yerli | G06T 13/20 703/6 |
| 2014/0221090 A1* | 8/2014 | Mutschler | A63F 13/65 463/31 |
| 2017/0116693 A1 | 4/2017 | Rae et al. | |
| 2017/0140484 A1 | 5/2017 | Lete et al. | |
| 2017/0178272 A1 | 6/2017 | Lashkari et al. | |
| 2017/0203438 A1* | 7/2017 | Guerin | B25J 9/1605 |
| 2017/0267099 A1* | 9/2017 | Yerli | B60K 35/00 |
| 2017/0293705 A1* | 10/2017 | Van der Velden | G06F 30/20 |
| 2017/0294044 A1* | 10/2017 | Yerli | G06F 3/167 |
| 2018/0075652 A1 | 3/2018 | Kim | |
| 2018/0096362 A1 | 4/2018 | Kwan | |
| 2018/0131907 A1* | 5/2018 | Schmirler | G05B 23/0216 |
| 2018/0174122 A1* | 6/2018 | Mattingly | H04L 9/3239 |
| 2018/0322597 A1 | 11/2018 | Sher | |
| 2019/0108580 A1 | 4/2019 | Spivack et al. | |
| 2019/0333174 A1 | 10/2019 | Jung | |
| 2019/0342472 A1* | 11/2019 | Chapman | H04N 21/4223 |
| 2019/0361589 A1* | 11/2019 | Yerli | G06F 3/011 |
| 2020/0099891 A1* | 3/2020 | Valli | H04N 7/147 |

FOREIGN PATENT DOCUMENTS

| | | |
|---|---|---|
| EP | 3318945 A2 | 5/2018 |
| EP | 3318945 A3 | 5/2018 |
| EP | 3376361 A2 | 9/2018 |

OTHER PUBLICATIONS

Extended European Search Report dated Apr. 9, 2020, issued in European Application No. 20180829.2, 9 pages.

Office Action dated May 10, 2022, issued in U.S. Appl. No. 16/904,015, filed Jun. 17, 2020, 24 pages.

* cited by examiner

VIRTUAL CREATION OF REAL-WORLD PROJECTS

CROSS-REFERENCE TO RELATED APPLICATION

This application claims the benefit of Provisional Application No. 62/863,105, filed Jun. 18, 2019, the entire disclosure of which is hereby incorporated by reference herein for all purposes.

FIELD

The present disclosure generally relates to computer systems, and more specifically to a system and method for enabling collaborative virtual creation of real-world projects.

BACKGROUND

Originally, urban planning has been characterized by collaboration between a city administration and constructing companies. Typically, a city administration is responsible for planning the urban development of a city, and after determining the needs, liaises with various constructing companies that provide tenders to the city administration, which in the end selects the most suitable offers. Given this approach, which in most cases involves collaboration between city administration and service providers, normal citizens are not taken into account in urban planning. However, normal citizens are those that spend a large portion of their time in the city, and therefore may as well provide useful project proposals that can be used in the decision making and even in the designing process involved in urban planning. For example, normal citizens in a neighborhood may detect needs that can go otherwise overseen by a city administration, such as the need of a traffic light, a school, a gas station, a bridge, relocating a specific object, and the like.

Although computer technology is often used for interacting with citizens on such projects, it is typically limited to presentation of websites, digital opinion surveys, video conferences, email communication, and the like. Although interactions of this nature may provide some information about the location of interest and the nature of the project, they do not provide any ability for citizens to experience the location and the need for the project remotely. For example, citizens may be informed by a website or an email that pedestrian safety is a concern at a particular intersection, but a website provides no ability for those citizens to inspect the intersection remotely and safely, or to digitally collaborate with city planners or other citizens in an immersive way on a proposed modification of the intersection.

Therefore, what is required is a system and method that can provide normal citizens with the ability to propose real-world projects that can be viewed by construction companies for providing tenders and which can be integrally evaluated by a city administration.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more problems described in the background or other technical problems are addressed by a system and method for providing a virtual collaborative creation of real-world projects of the current disclosure. The system comprises one or more server computers including a memory and a processor, wherein the server system stores a database with structured data storing virtual replicas of real-world elements forming a persistent virtual world system. The virtual world replicas are developed via a replica editor stored in the server system. The system further comprises a plurality of connected devices connected to the server system via a network, each connected device comprising communication circuitry and one or more sensors, wherein the plurality of connected devices is configured to capture multi-source data from the real-world elements that serve to enrich the virtual replicas and synchronize the virtual replicas with the corresponding real-world elements. The server system further comprises collaborative platforms including a collaborative creation platform, a collaborative tender platform, and a collaborative administration platform that enable, respectively, creation, tender offering, and administrative reviewing and approval or rejection of real-world projects. In an embodiment, one or more user devices are connected to the server via a network and configured to provide user access to the collaborative platforms.

The system of the current disclosure enables, via the collaborative creation platform, creation of virtual projects in the persistent virtual world system representing proposed real-world projects, wherein the virtual projects include one or more of the virtual replicas of the real-world elements. The creation of the virtual projects may include designing and positioning virtual versions of proposed real-world projects at real-world locations that are based on the replicas of real-world elements stored in the server, and may thus be viewed and voted on by users either in merged or virtual reality. Through the tender platform, users such as construction company representatives may review the projects and offer tenders for selected projects. Through the collaborative administration platform, the projects may be reviewed by a city administration such as a city administration, including enabling the review of each project, the voting scores for each, and the proposed tenders. In this way, opinions from normal citizens may transcend conventional voting or other slower, less efficient and less interactive methods, such as filling out online forms or sending letters with opinions to a city administration. Involving citizens in urban planning through systems and methods of the current disclosure may contribute to efforts of achieving a digital democracy, whereby citizens take part in decisions that concern everyone but that are typically taken only by the city administration.

According to various embodiments, the collaborative creation platform further enables defining and assigning material requirements for each project. In one embodiment, when selecting a predefined asset such as a new building, the predefined asset may already include a standard number of materials and a corresponding estimated cost required in order to perform the project. This data is stored in a project database that comprises predefined dynamic bills of materials and corresponding estimated budgets that may be automatically adjusted and updated as a project is modified. In another embodiment, the collaborative creation platform may provide users with the option to modify the materials and budget, if necessary, such as when requiring higher or lower quality materials. In another embodiment, when selecting to create a new asset for a project, the collaborative creation platform may provide users with the option to assign materials and budget to the project themselves as estimated by the users. In another embodiment, the collaborative creation platform may provide users with the option to request an estimate of materials and budget that may be retrieved from the project database and which may be calculated based on other similar projects.

According to an embodiment, the collaborative tender platform enables users to view the created and voted projects, whereby a construction service provider may provide tenders that may include an estimated cost and time of the tender. In other embodiments, the tender may additionally include other data, such as a breakdown of the materials required to carry out the project and an estimated cost for each. In other embodiments, the collaborative tender platform may enable construction service providers to provide references about previous works performed by them or about the construction service entity. For example, the collaborative tender platform may enable construction service providers to provide access to a personal projects database, where each of the projects may include a rating and review from other users with respect to the quality of the projects or of the service provider.

According to an embodiment, the collaborative administration platform further enables city administrators to allocate budgets for each project and provide them to users in order to build the projects. The budgets may be used by citizens to build the projects by, for example, searching for construction companies themselves. In other embodiments, the budgets may be provided directly by the city administration directly to the construction companies.

The replica editor is configured to input data and instructions of the virtual replicas into the persistent virtual world system. The replica editor may be, for example, a computer-aided drawing (CAD) or computer-aided engineering (CAE) software that may store data and instructions necessary to input and edit and test the virtual replicas.

Modeling tools comprised in the replica editor are configured to enable users to build the virtual replicas. In some embodiments, the modeling tools include 3D game engine software development kits. Modeling tools enable generating virtual replicas with data and instructions based on readily-available CAD or CAE models of the real-world elements. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging may be used to map and model real-world elements before integrating them into the persistent virtual world system. In a yet further embodiment, the collaborative platforms of the system of the current disclosure additionally enables implementation of recommender systems in order for users to rank and filter, via each collaborative platform, which projects to work on (e.g., via the collaborative creation platform), which projects to set a tender on (e.g., via the collaborative tender platform), or which projects to approve or reject and set budgets on (e.g., via the collaborative administration platform). The recommender systems may use, for example, collaborative filtering or simulated filtering, which may be run by the server via simulation engines or through external platforms connected to the system via a network through suitable APIs or SDKs. Collaborative filtering enables recommending and filtering projects based on collecting and analyzing a large amount of information on users behaviors, activities or preferences and predicting what users will like based on their similarity to other users. For example, collaborative filtering may be based on comparing voting data from other users to the voting data of the current users, and then matching similar projects for making recommendations. Simulated filtering may include running goal-based simulations of a city and then matching the simulation results with the projects that best fit the needs of the city in order to provide recommendations and corresponding ranking and filtering. In an embodiment, the simulated filtering includes running goal-based simulations (which may be based at least in part on captured multi-source data from real-world elements) to obtain simulation results and comparing the simulation results with one or more aspects of the projects. For example, a carbon emission simulation, traffic simulation, energy usage simulations, or a commuting time simulation, can be run with the goal to optimize the conditions of each specific aspect.

In an illustrative scenario, a virtual project may be directed to a proposed project for redesigning a public transportation system to reduce power consumption and carbon emissions in a city. The virtual project may include, for example, a virtual replica of a real-world power plant, which may be updated with captured data from CO2 sensors at the power plant, and a virtual replica of a real-world subway system, which may be updated with captured data from sensors that measure power consumption in the subway system. In this scenario, a carbon emission simulation of the project may be performed based at least in part on the captured CO2 sensor data and/or the power consumption data. The simulation may indicate, for example, a reduction in overall power consumption linked to a proposed extension of the subway system to a new area of the city.

The results of the simulations may be used by the system to match suitable projects that go in line with the goals, and may be provided to users as a set of recommendations that may be ranked and filtered accordingly. For example, a city administrator may filter the projects according to those that would produce the best energy optimization for a specific area of the city.

The collaborative platforms are viewable and interfaced via user devices that may include one or more mobile devices, personal computers, game consoles, media centers, smart contact lenses, and head-mounted displays, amongst others. The user devices may be equipped with sensors to determine a relative position and orientation of the user device (three coordinates) as well as a relative orientation of the headset (three angles) with regard to the viewer. This tracking information amount to 6 degrees of freedom for the user device that may determine how the output stream will be generated from the plurality of virtual frames.

In various embodiments, the user interface with the collaborative platforms is provided in merged reality or in virtual reality. According to an embodiment, the collaborative creation platform enables selecting predefined assets. The predefined assets may have been approved in advance by a city administration. For example, a predefined asset may be a bridge, a building, a pedestrian traffic light, a vehicle traffic light, and a speed limit sign, amongst others. In some embodiments, the predefined assets may be further modified by a user to adjust the needs of the user. In other embodiments, the collaborative creation platform enables modeling of new assets to represent a project. The collaborative creation platform may enable selecting, modifying, or creating assets via a user interface in merged reality or virtual reality and adding the assets to virtual projects, which may be placed in desired locations in the one or more virtual projects. The desired locations may correspond to real-world locations. In these embodiments, the collaborative creation platform may comprise CAD or CAE software including tools that enable the modeling of new assets. In other embodiments, the collaborative platform enables moving or changing an existing real-world entity. For example, a user may propose to move a tree or a specific structure from a location into another. The collaborative creation platform uses the location of the real-world elements via the virtual replicas. Thus, users may be able to place the projects at the intended location in the real world. After storing the project in the persistent virtual world system and sharing with other users, other users may have the ability to view the projects and vote for the preferred ones.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data at 60 GHz. Provided communication systems may allow for (low, e.g., about 1 to about 5 millisecond) end-to-end (E2E) latency and high (e.g., 1-10 Gbps) downlink speeds to end points in the field, complying with parameters necessary for executing the typically highly-interactive digital reality applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, the sensing mechanisms mounted on the user devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., GPS, visual imaging, radar technology, etc.). In alternative embodiments, the sensing mechanisms and transceivers may be coupled together in a single tracking module device. The sensing mechanisms of the user devices may also include one or more cameras. For example, the cameras may be depth-cameras installed in the user devices. The cameras may be configured to capture and provide the viewing position and orientation of the user which determines the viewing position and orientation of the virtual frames that are sent via the engine platform server.

Providing an accurate tracking of the connected elements may result useful for displaying a reliable status of user devices within the persistent virtual world system, in particular their position and orientation, which may be relevant for viewing the correct position orientation of the virtual elements that represent the real-world projects.

According to an embodiment, a computer-implemented method for virtual collaborative creation of real-world projects comprises providing a persistent virtual world system including a replica editor and virtual replicas of real-world elements that are created using the replica editor; synchronizing the virtual replicas with the real-world elements using multi-source data captured by sensors of connected devices in communication with the server system; and providing a collaborative creation platform stored in the server system, which enables creation of one or more virtual projects in the persistent virtual world system representing one or more real-world project proposals and enables voting on the one or more real-world project proposals. In an embodiment, the method further includes providing a collaborative tender platform stored in the server system, which enables providing one or more tenders to the one or more real-world project proposals; and providing a collaborative administrative platform in the server system, which enables reviewing, approving or rejecting, and allocating budgets for the one or more real-world project proposals.

In an embodiment, the method further includes, by one or more client devices, creating, via a collaborative creation platform stored in the server, one or more real-world project proposals that are stored in a project database stored in the memory of the server; voting, via the collaborative creation platform stored in the server, for one or more real-world project proposals; providing, via a collaborative tender platform stored in the server, one or more tenders to each real-world project proposal; reviewing, via a collaborative administrative platform, one or more real-world projects; and approving or rejecting, via the collaborative administrative platform, the one or more real-world projects.

A computer readable medium having stored thereon instructions configured to cause one or more computing devices, such as a server system or client device, to perform methods disclosed herein is also disclosed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
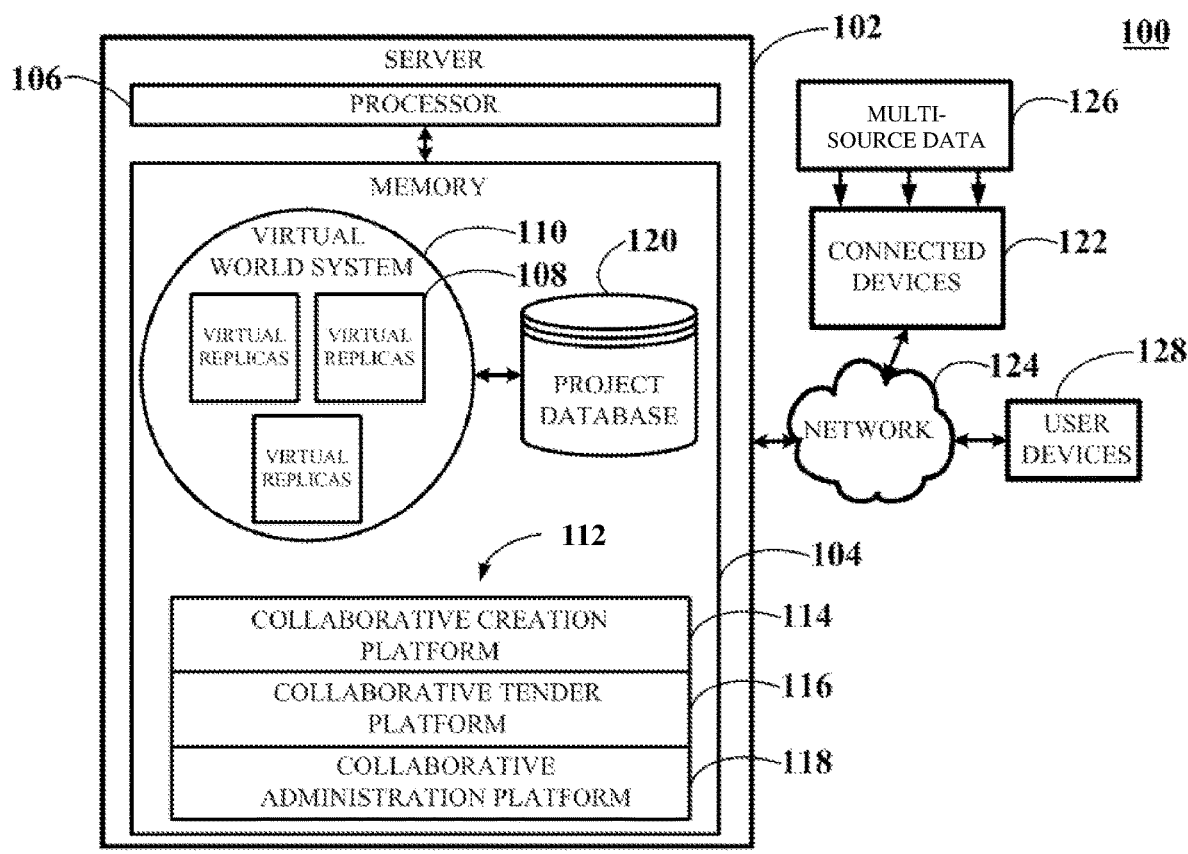
FIG. 1 depicts a schematic representation a system for virtual collaborative creation of real-world projects, detailing a server, according to an embodiment.

FIG. 1 depicts a schematic representation of a system 100 for virtual collaborative creation of real-world projects, detailing a server, according to an embodiment. The system 100 comprises a server 102 including a memory 104 and a processor 106, wherein the memory 104 stores a database with structured data storing virtual replicas 108 of real-world elements that constitute a persistent virtual world system 110, and wherein the processor 106 is configured to execute instructions stored in the memory 104. The virtual replicas 108 are developed via a replica editor (not shown) stored in the memory 104. The memory 104 further stores collaborative platforms 112 including a collaborative creation platform 114, a collaborative tender platform 116, and a collaborative administration platform 118 that enable, respectively, the creation, tender offering, and administrative reviewing and approval or rejection of real-world projects. The memory 104 further stores a project database 120 configured to store project data. Although the system 100 is described as including a single server 102 in examples disclosed herein, it will be understood that functions described herein as being performed by a single server (e.g., server 102) may instead be performed by server system comprising multiple server computers, or vice versa.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location, e.g., in the server 102. In this way, virtual replicas, purely virtual objects and digital reality applications may interact and collaborate with each other when being configured for accomplishing specific goals even if users are not connected to the server.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

The system 100 further comprises a plurality of connected devices 122 connected to the server 102 via a network 124, each connected device 122 comprising communication circuitry and sensing mechanisms configured to capture multi-source data 126 from real-world elements that serve to enrich the virtual replicas 108 and synchronize the virtual replicas 108 with corresponding real-world elements. Thus, virtual replicas 108 may obtain data from one or more sources (e.g., from one or more real-world elements, environmental sensors, computing devices, etc.). As used herein, the term "multi-source" refers to data that may be obtained from multiple sources. Furthermore, one or more user devices 128 are connected to the server 102 via a network 124 and configured to provide user access to the collaborative platforms 112.

Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on the multi-source data 126. Enriching a virtual replica may be considered a special form of updating the virtual replica with one or more new forms of data that may not have been previously present in the virtual replica. For example, enriching the virtual replicas may refer to providing real-world data captured from sensing mechanisms on the plurality of connected devices 122, wherein the further real-world data comprises video data, temperature data, real-time energy consumption data, real-time water consumption data, speed or acceleration data, or the like.

The replica editor is configured to input data and instructions of the virtual replicas 108 into the persistent virtual world system 110. The replica editor may be, for example, a computer-aided drawing (CAD) or computer-aided engineering (CAE) software that may store data and instructions necessary to input and edit virtual replicas. The replica editor may enable the input of data and instructions that relate to each digital replica, which describe the shape, location, position and orientation, physical properties, and the expected functioning and impact of each replica. Generally, data input through the replica editor may include data that may not be obtained by the sensing mechanisms, such as priority data, building materials, wall thicknesses, electric installations and circuitry, water pipes, fire extinguishers, emergency exits, window locations, machine performance parameters, machine sensor and valve locations, etc. The data and instructions input through the replica editor may include, apart from the shape and other properties of a real-world element, descriptive data and instructions that detail the expected functioning and behavior of the real-world element, including, for example, expected electricity and water consumption, expected flow of people in a building, and expected carbon footprint of a facility.

The modeling tools are configured to enable users to build the virtual replicas 108. In some embodiments, the application development tools include 3D game engine software development kits. Modeling tools enable generating virtual replicas with explicit data and instructions based on readily-available CAD or CAE models of the real-world elements. For example, machine owners may provide an administrator of the persistent virtual world system or may input by themselves the already-existing digital CAD or CAE models of their machines. Similarly, building owners may provide building information models (BIM) with building details to be stored in the persistent virtual world system, which may include information that may not be visible or easily obtainable via sensing mechanism. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging, such as synthetic-aperture radars, real-aperture radars, Light Detection and Ranging (LIDAR), inverse aperture radars, monopulse radars, and other types of imaging techniques may be used to map and model real-world elements before integrating them into the persistent virtual world system. Utilizing these more technical solutions may be performed especially in cases where the original models of the structures are not available, or in cases where there is missing information or there is a need to add additional information to the virtual world entities which is not provided by the CAD or CAE models.

In some embodiments, a virtual replica 108 includes one or more of 3D world and building data, such as SLAM or derivate-mapping based data; 3D geometry data; 3D point cloud data; or geographic information system data representing real-world structural properties that may serve to model a 3D structure for digital reality applications.

The collaborative platforms 112 are viewable and interfaced via user devices 128 that may include one or more mobile devices, personal computers, game consoles, media centers, smart contact lenses, and head-mounted displays, amongst others. The user devices may be equipped with sensors to determine a relative position and orientation of the user device 128 (three coordinates) as well as a relative orientation of the headset (three angles) with regard to the viewer. This tracking information amount to 6 degrees of freedom for the user device 128 that may determine how the output media stream will be generated.

Users may interface with the collaborative platforms in merged reality or in virtual reality. In merged reality, the user may view the real world elements plus the one or more published virtual projects attached to the real-world locations as virtual elements. Thus, merged reality comprises physical, real-world environment elements augmented by computer-generated input such as sound, video, graphics, and GPS or other tracking data. Augmentation techniques in merged reality are typically performed in real-time and in semantic context with environmental elements, such as overlaying supplemental information or virtual objects in the real world. In virtual reality, the user may view the same real-world scenario in a fully virtualized manner, replacing the real world with a simulated one. For example, the user may, from his home location, be able to select a remote location and explore that location in order to find the one or more virtual projects corresponding to project proposals, or even representations of real-world projects (which may have been initiated in response to approval of virtual projects) represented as virtual elements. In some embodiments, both in merged reality and in virtual reality, the user may be able to view, add, and vote for projects from a remote location or from the real location where the projects are located. For example, a user may use the collaborative platform from a computer or other user device 128 located at his home, and may view and interact with the collaborative platform from that location. Likewise, the user may also use the collaborative platform in merged reality by using a user device 128 in the real location of the projects. Similarly, other collaborative platforms, such as the tender platform and the admin reviewing platform, may also be interfaced either in merged reality or virtual reality.

In some embodiments, the virtual projects are virtual elements that include at least one of the following: 3D image data, 3D geometries, 3D entities, 3D sensory data, 3D dynamic objects, video data, audio data, textual data, time data, positional data, orientational data, and lighting data. The virtual projects may include one or more virtual replicas of real-world elements, examples of which are described herein.

In an embodiment, in order to reduce hardware and network demands, contribute to the reduction of network latency, and improve the general digital reality experience, the system 100 may connect through a network 124 including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive real-world projects. This results in high-quality, low latency, real-time digital application content streaming. In other embodiments, the system 100 may communicatively connect through 4th generation wireless systems communication (4G), may be supported by 4G communication systems, or may include other wired or wireless communication systems.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, each of the virtual replicas may be geolocated using a reference coordinate system suitable for use with current geolocation technologies. For example, the virtual replicas may use a World Geodetic System standard such as WGS84, which is the current reference coordinate system used by GPS.

According to an embodiment, the multi-source data 126 further comprises capturable data of each real-world element, comprising one or more of 3D image data, 3D geometries, 3D entities, 3D sensory data, 3D dynamic objects, video data, audio data, priority data, chemical composition, waste production data, textual data, time data, positional data, orientational data, velocity data, temperature data, humidity data, pollution data, lighting data, volume data, flow data, chromatic data, power consumption data, bandwidth data, and mass data. The plurality of sensing mechanisms comprise one or more temperature sensors, proximity sensors, inertial sensors, infrared sensors, pollution sensors, pressure sensors, light sensors, ultrasonic sensors, smoke sensors, touch sensors, chromatic sensors, humidity sensors, water sensors, and electrical sensors. Synchronizing the virtual replicas 108 with real-world elements may enable not just to obtain an accurate position of each of the real-world elements, but also enriches the virtual replicas 108 with data about the real-time functioning of the real-world elements, which may be relevant in various situations, such as energy, water, and pollution management.

"Priority data," as used herein, refers to a hierarchical classification of real-world elements. For example, certain vehicles (e.g., ambulances) or people (e.g., presidents, government officials, police officers, etc.) may have higher priorities which may affect the decisions performed based on data inference.

The term "instructions," as used herein, refers to code (e.g., binary code) that is configured to be executed by a processor. In the context of a virtual replica, instructions may refer code that represents the behavior of the real-world element. Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages.

"Real world elements," as used in the current disclosure, refers to elements found in the real world which may be sensed by sensing mechanisms. For example, the real-world elements may be moving or static entities found in the real world, including human beings, vehicles, buildings, objects, recreation areas, natural formations, and streets, amongst others.

Figure 2:
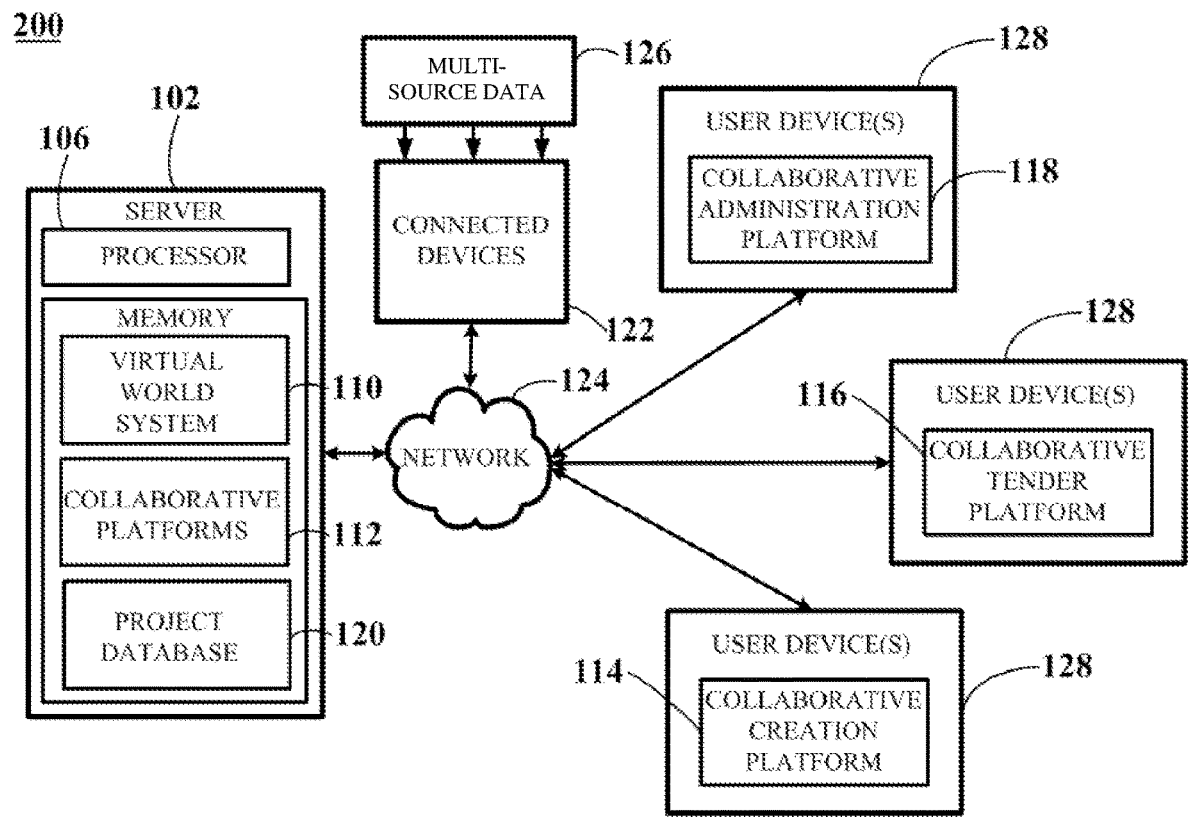
FIG. 2 depicts a schematic representation of a system for virtual collaborative creation of real-world projects, detailing various collaborative platforms, according to an embodiment.

FIG. 2 depicts a schematic representation of a system 200 for virtual collaborative creation of real-world projects, detailing various collaborative platforms 112, according to an embodiment. Some elements of FIG. 2 may be similar to elements of FIG. 1, and thus similar or identical reference numerals may be used to depict those elements.

In system 200, user devices 128 connected to a network 124 access the server 102 that stores in a memory 104 a plurality of collaborative platforms 112, a persistent virtual world system 110, and a project database 120. The collaborative platforms 112 include a collaborative creation platform 114, collaborative tender platform 116, and collaborative administration platform 118, which users may interface via user devices 128.

The collaborative creation platform 114 interfaced through a client device 128, enables creation of virtual projects. Users may design and position virtual versions of proposed real-world projects at a real-world location based on the replicas of real-world elements stored in the server 102, and may thus be viewed and voted on by users either in merged or virtual reality. Through the collaborative tender platform 116 interfaced through a client device 128, users such as construction company representatives may review the projects and offer tenders for selected projects. Through the collaborative administration platform 118 interfaced through a client device 128, the projects may be reviewed by a city administration such as government entities or representatives, including enabling the review of each project, the voting scores for each, and the proposed tenders, in order to approve or reject the projects. In this way, opinions from normal citizens may transcend conventional voting or other slower, less efficient, and less interactive methods, such as filling out online forms or sending letters with opinions to a city administration. Involving citizens in urban planning through systems and methods of the current disclosure may contribute to efforts of achieving a digital democracy, whereby citizens take part in decisions that concern everyone but that are taken only by the city administration.

In a yet further embodiment, the collaborative platforms 112 additionally enable implementation of recommender systems in order for users to rank and filter, via each collaborative platform 112, which projects to work on (i.e., via the collaborative creation platform 114), which projects to set a tender on (i.e., via the collaborative tender platform 116), or which projects to approve or reject and set budgets on (i.e., via the collaborative administration platform 118). The recommender systems may use, for example, collaborative filtering or simulated filtering, which may be run by the server via simulation engines or through external platforms connected to the system via a network through suitable APIs or SDKs.

Collaborative filtering enables recommending and filtering projects based on collecting and analyzing a large amount of information on users behaviors, activities or preferences and predicting what users will like based on their similarity to other users. For example, collaborative filtering may be based on comparing voting data from other users to the voting data of the current users, and then matching similar projects for making recommendations.

Simulated filtering may enable running goal-based simulations of a city and then matching the simulation results with the projects that best fit the needs of the city in order to provide recommendations and corresponding ranking and filtering. In an embodiment, the simulated filtering includes running goal-based simulations (which may be based at least in part on captured multi-source data from real-world elements) to obtain simulation results and comparing the simulation results with one or more aspects of the projects. For example, a carbon emission simulation, traffic simulation, energy usage simulations, or a commuting time simulation, can be run with the goal to optimize the conditions of each specific aspect. The results of the simulations may be used by the system to match suitable projects that go in line with the goals, and may be provided to users as a set of recommendations that may be ranked and filtered accordingly. For example, a city administrator may filter the projects according to those that would produce the best energy optimization for a specific area of the city.

In an illustrative scenario, a virtual project may be directed to a proposed project for redesigning a public transportation system to reduce power consumption and carbon emissions in a city. The virtual project may include, for example, a virtual replica of a real-world power plant, which may be updated with captured data from $CO_2$ sensors at the power plant, and a virtual replica of a real-world subway system, which may be updated with captured data from sensors that measure power consumption in the subway system. In this scenario, a carbon emission simulation of the project may be performed based at least in part on the captured $CO_2$ sensor data and/or the power consumption data. The simulation may indicate, for example, a reduction in overall power consumption linked to a proposed extension of the subway system to a new area of the city.

Figure 3:
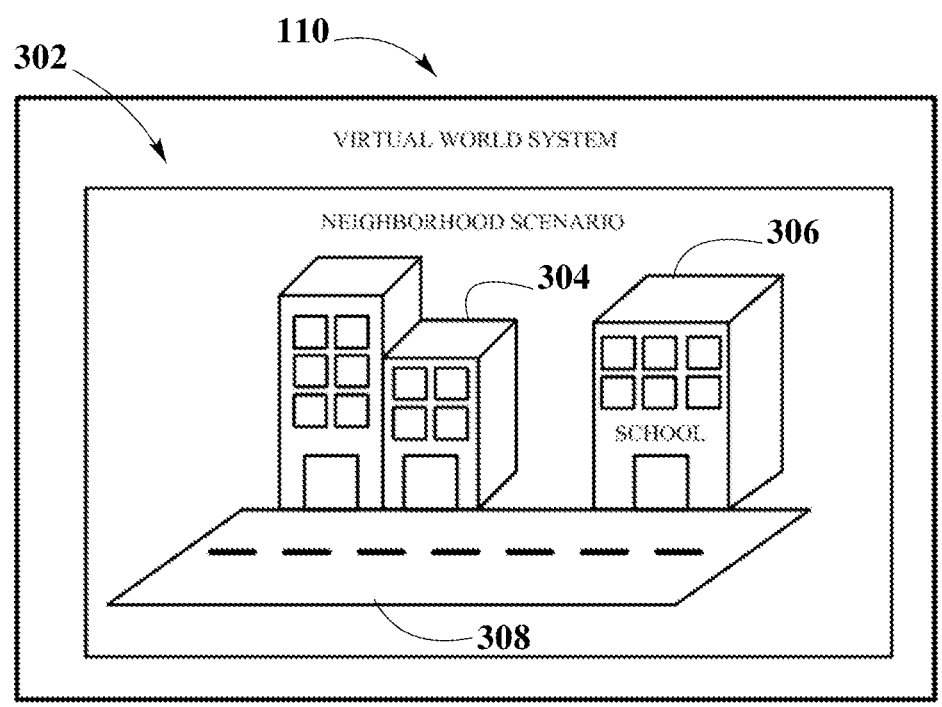
FIG. 3 depicts a schematic representation of a neighborhood scenario within a virtual world system, according to an embodiment.

FIG. 3 depicts a schematic representation of a sample neighborhood scenario 302 within a persistent virtual world system 110, according to an embodiment. Some elements of FIG. 3 may be similar to elements of FIGS. 1-2, and thus similar or identical reference numerals may be used to depict those elements.

The neighborhood scenario 302 includes several real-world elements such as buildings 304, a school 306, and a street 308. Each of these real-world elements may be modeled via a replica editor and published in the persistent virtual world system 110, which may include several neighborhoods, districts, and even cities or countries. Some of the real-world elements may include or be connected to sensing mechanisms that enable a real-time synchronization between the virtual replicas and the real-world elements.

Figure 4A:
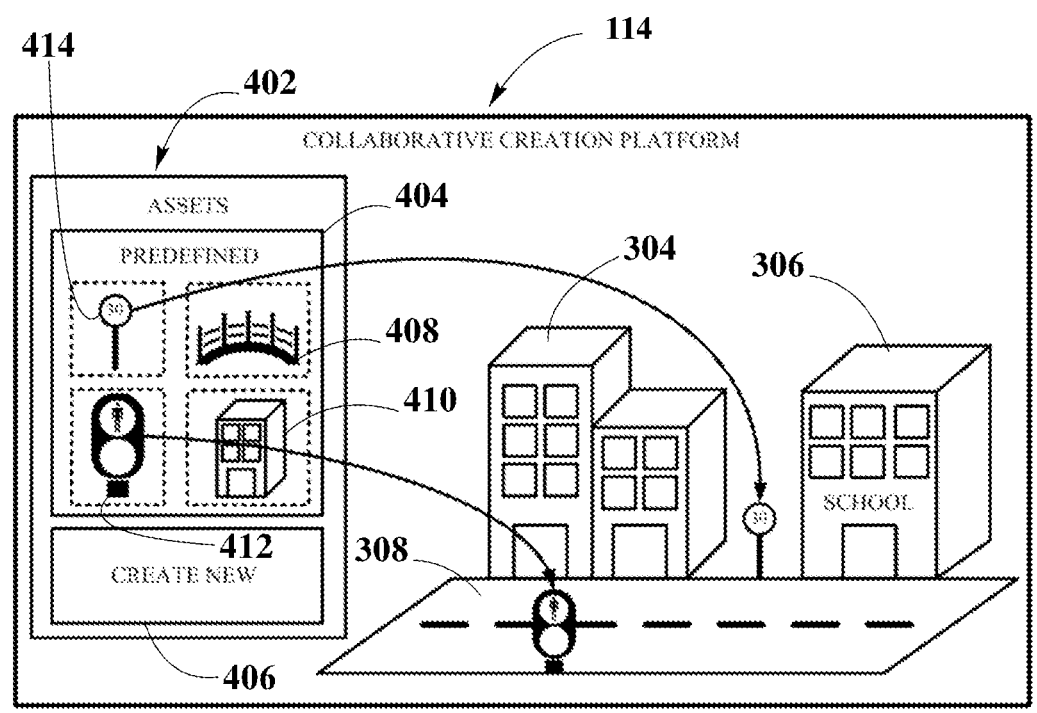
FIGS. 4A-4C depict a schematic representation of a collaborative creation platform, according to an embodiment.
Figure 4B:
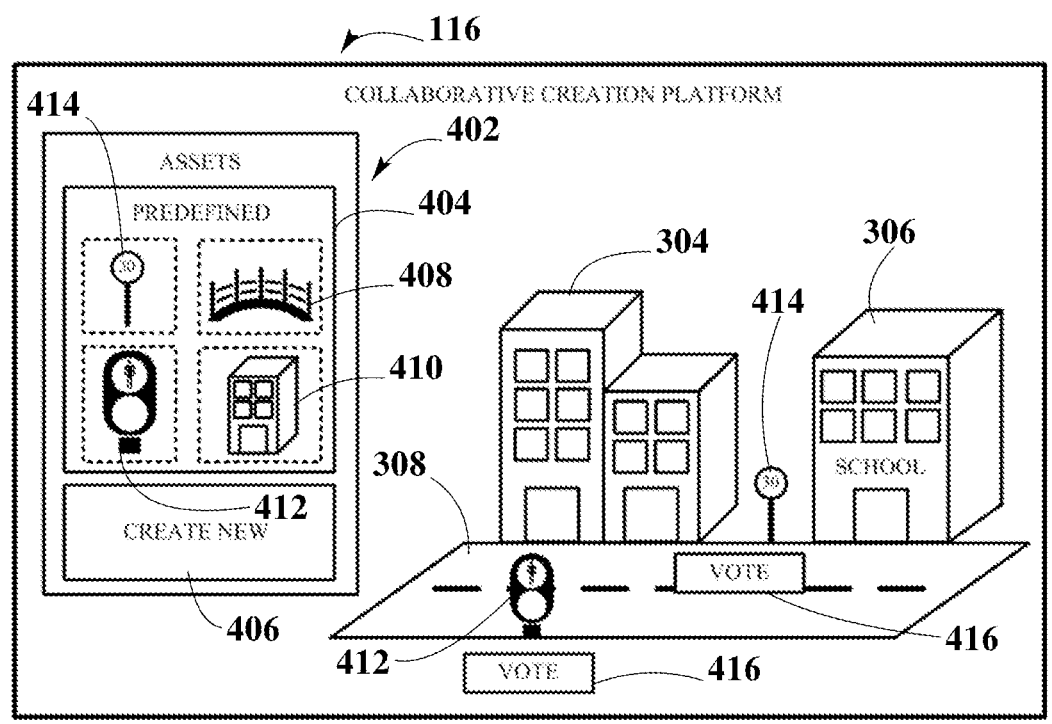
Figure 4C:
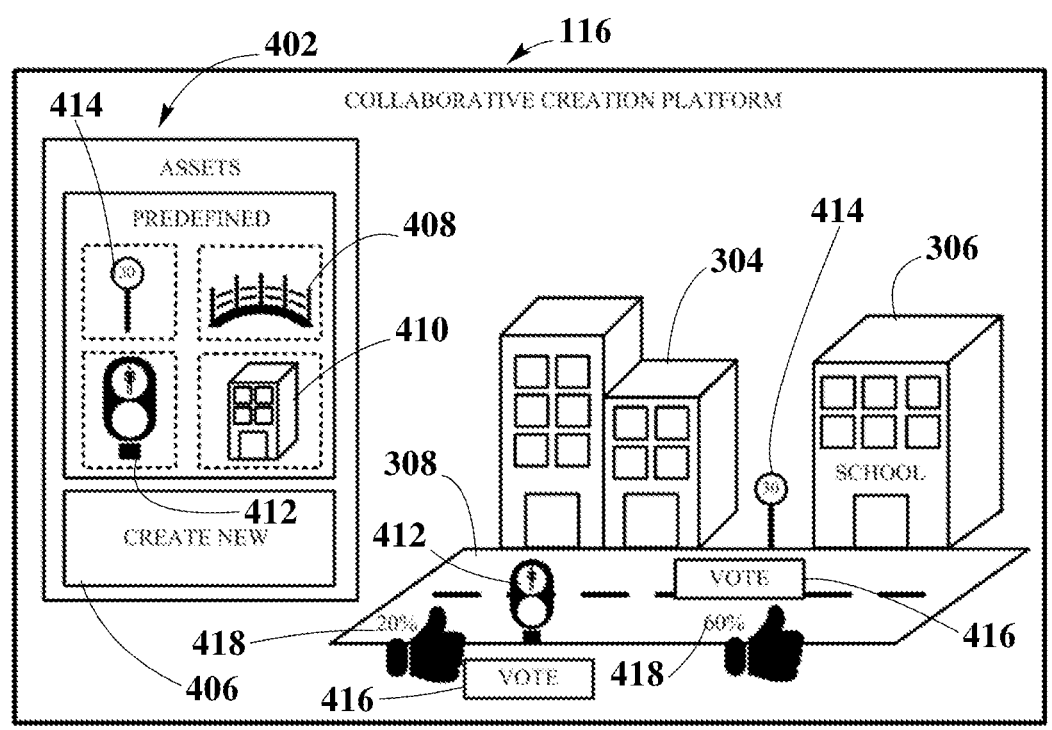

FIGS. 4A-4C depict a schematic representation of a user interface for creating a virtual project in a collaborative creation platform 114, according to an embodiment. Some elements of FIGS. 4A-4C may be similar to elements of FIGS. 1-3, and thus similar or identical reference numerals may be used to depict those elements.

With reference to FIG. 4A, a user interface of the collaborative creation platform 114 enables selecting or modeling assets 402 that may represent a proposed real-world project and which may be positioned on a desired real-world location. The assets 402 may be predefined assets 404 or new assets 406. The predefined assets 404 may have been approved in advance by a city administration. For example, a predefined asset 404 may be a bridge 408, a new building 410, a pedestrian traffic light 412, and a speed limit sign 414, amongst others. In some embodiments, the predefined assets 404 may be further modified by a user to adjust to the specific needs of the user.

The new assets 406 may be modeled via CAD or CAE software available at the collaborative creation platform 114. The collaborative creation platform 114 uses the location of the real-world elements via the virtual replicas. Thus, in an augmented reality scenario, users may be able to place the virtual project at the intended location in the real world, such that a user that is present in the location in the real world may view the virtual project or elements thereof via augmented reality (e.g., by viewing a virtual stop sign or traffic light as a virtual overlay at a location specified in the virtual project). Or, in a virtual reality scenario, users may place virtual projects at desired locations in a virtual space, which may correspond to a real location.

For example, as viewed in FIG. 4A, a speed limit sign 414 and pedestrian traffic light 412 are selected and positioned at a desired location within the neighborhood scenario 302. After placing a new virtual project on a desired location, the user may save the virtual project in a project database stored in the memory of the server.

According to various embodiments, the collaborative creation platform 114 further enables defining and assigning material requirements for each project. In one embodiment, when selecting a predefined asset 404 such as a new building 410, the predefined asset 404 may already include a standard number of materials and a corresponding estimated cost required in order to perform the project. This data is stored in a project database that comprises predefined dynamic bills of materials and corresponding estimated budgets that may be automatically adjusted and updated as a project is modified. In another embodiment, the collaborative creation platform 114 may provide users with the option to modify the materials and budget, if necessary, such as when requiring higher or lower quality materials. In another embodiment, when selecting to create a new asset 406 for a project, the collaborative creation platform 114 may provide users with the option to assign materials and budget to the project themselves as estimated by the users. In another embodiment, the collaborative creation platform 114 may provide users with the option to request an estimate of materials and budget that may be retrieved from the project database and which may be calculated based on other similar projects.

Making reference to FIG. 4B, after storing the project in the persistent virtual world system 110 and sharing with other users, other users may remotely access the data in the server via user devices and may be provided with the option to view the projects and vote 416 for the preferred ones.

Making reference to FIG. 4C, voting scores 418 for each of the projects are stored in the project database and are viewable by any of other users of the collaborative platforms, including project creators, construction service providers, and city administrators, amongst others.

Figure 5:
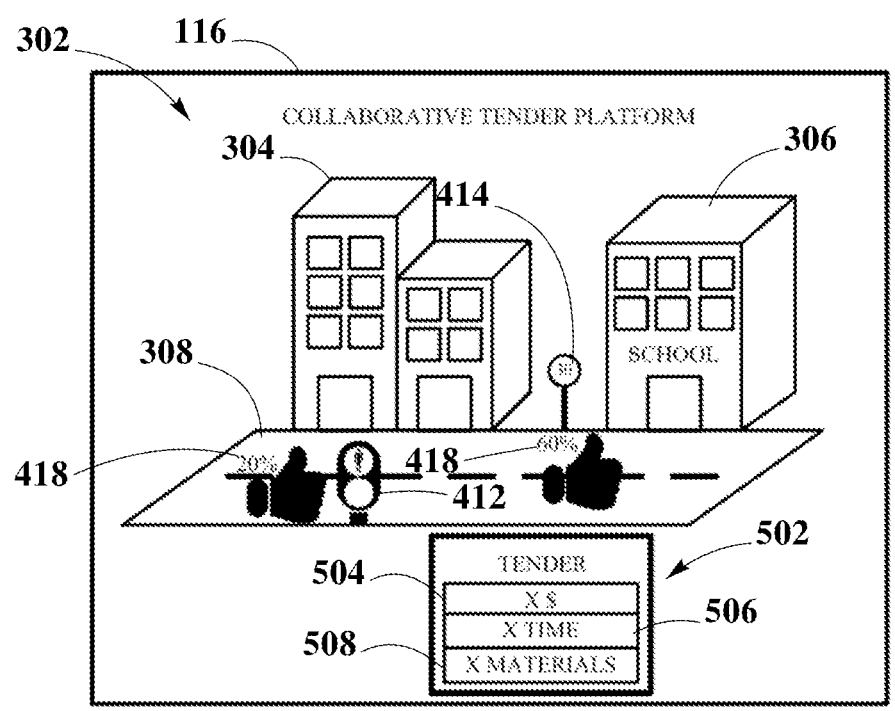
FIG. 5 depicts a schematic representation of a collaborative tender platform, according to an embodiment.

FIG. 5 depicts a schematic representation of a user interface for a collaborative tender platform 116, according to an embodiment. Some elements of FIG. 5 may be similar to elements of FIGS. 1-4C, and thus similar or identical reference numerals may be used to depict those elements.

In FIG. 5, the user interface for the collaborative tender platform 116 enables users to view virtual projects, such as the speed limit sign 414 and voting scores 418 selected and voted in FIGS. 4A-4C via the collaborative creation platform 114, and stored in the projected database. A construction service provider may use the collaborative tender platform 116 to place a tender 502 which may include an estimated cost 504 and estimated time 506. The tender 502 may, in other embodiments, include other data such as a breakdown of the materials 508 required to carry out the project and an estimated cost for each.

In other embodiments, the collaborative tender platform 116 may enable construction service providers to provide references about previous works performed by themselves or about the construction service entity. For example, the collaborative tender platform 116 may enable construction service providers to provide access to a personal projects database, where each of the projects may include a rating and review from other users with respect to the quality of the projects or of the service provider.

Figure 6:
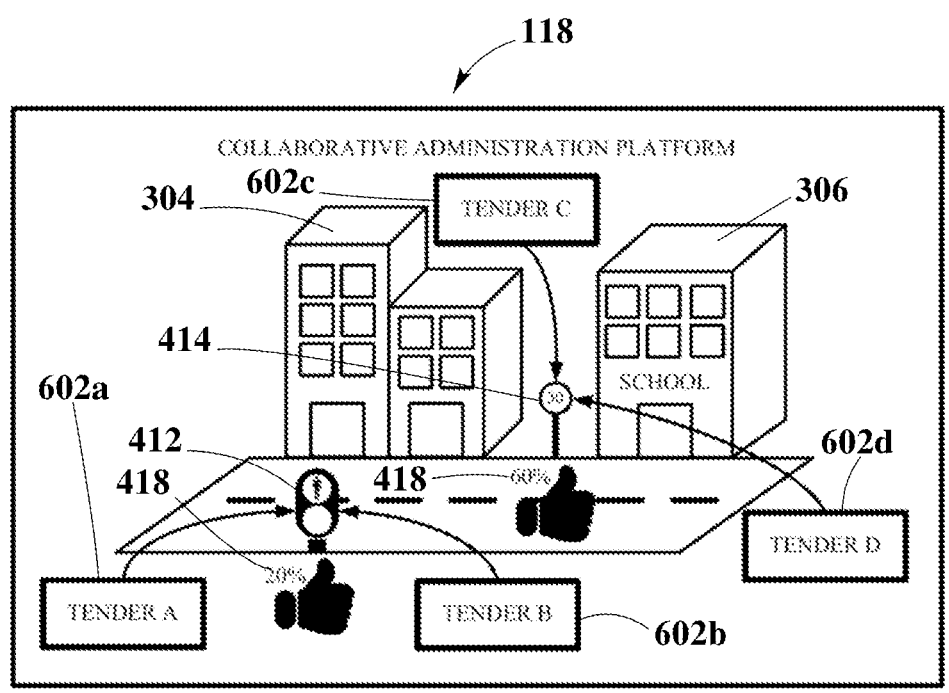
FIG. 6 depicts a schematic representation of a collaborative administration platform, according to an embodiment.

FIG. 6 depicts a schematic representation of a user interface for a collaborative administration platform 118, according to an embodiment. Some elements of FIG. 6 may be similar to elements of FIGS. 1-5, and thus similar or identical reference numerals may be used to depict those elements.

With reference to FIG. 6, regarding the neighborhood scenario 302, the user interface may display to city administrators the various virtual projects that have been created via the collaborative creation platform 114 along with the corresponding voting scores 418, and the various tenders, such as tenders 602a-d, published by one or more construction service providers via the collaborative tender platform.

According to an embodiment, the collaborative administration platform 118 further enables city administrators to allocate and provide budgets for each project to users in order to build the projects. The budgets may be used by project creators in collaboration with other citizens in order to build the projects by, for example, searching for construction companies themselves. In other embodiments, the budgets may be provided directly by the city administration directly to the construction companies that have provided corresponding tenders 502 via the collaborative tender platform 116.

Figure 7:
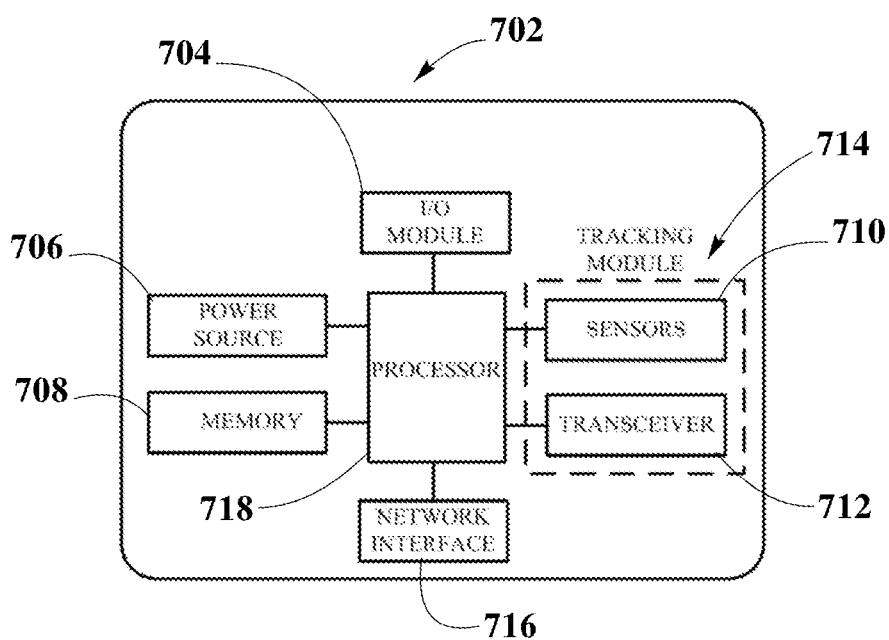
FIG. 7 depicts a schematic representation of a device that may be used with systems of the current disclosure, according to an embodiment.

FIG. 7 depicts a schematic representation of devices 702 (e.g., user devices, connected devices) that may be used with systems of the current disclosure, according to an embodiment.

A device 702 of the current disclosure may include operational components such as an input/output (I/O) module 704; a power source 706; a memory 708; sensing mechanisms 710 and communication circuitry, which may include transceivers 712 (e.g., forming a tracking module 714 with sensing mechanisms 710 in connected devices) and a network interface 716, all operatively connected to a processor 718.

The I/O module 704 is implemented as computing hardware and software configured to interact with users and provide user input data to one or more other system components. For example, I/O module 704 may be configured to interact with users, generate user input data based on the interaction, and provide the user input data to the processor 718 before being transferred to other processing systems via a network, such as to a server. In another example, I/O modules 704 is implemented as an external computing pointing device (e.g., a touch screen, mouse, 3D control, joystick, gamepad, and the like) and/or text entry device (e.g., a keyboard, dictation tool, and the like) configured to interact with device 702. In yet other embodiments, I/O module 704 may provide additional, fewer, or different functionality to that described above.

The power source 706 is implemented as computing hardware and software configured to provide power to the devices 702. In one embodiment, the power source 706 may be a battery. The power source 706 may be built into the devices 702 or removable from the devices 702, and may be rechargeable or non-rechargeable. In one embodiment, the devices 702 may be repowered by replacing one power source 706 with another power source 706. In another embodiment, the power source 706 may be recharged by a cable attached to a charging source, such as a universal serial bus ("USB") FireWire, Ethernet, Thunderbolt, or headphone cable, attached to a personal computer. In yet another embodiment, the power source 706 may be recharged by inductive charging, wherein an electromagnetic field is used to transfer energy from an inductive charger to the power source 706 when the two are brought in close proximity, but need not be plugged into one another via a cable. In another embodiment, a docking station may be used to facilitate charging. The memory 708 may be implemented as computing hardware and software adapted to store application program instructions and to store data captured by the plurality of sensing mechanisms. The memory 708 may be of any suitable type capable of storing information accessible by the processor 718, including a computer-readable medium, or other medium that stores data that may be read with the aid of an electronic device, such as a hard-drive, memory card, flash drive, ROM, RAM, DVD or other optical disks, as well as other write-capable and read-only memories. The memory 708 may include temporary storage in addition to persistent storage.

The sensing mechanisms may be implemented as computing hardware and software adapted to obtain various data from the real world and determine/track the position and orientation of the devices 702. The sensing mechanisms may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms include one or more Inertia Measuring Units (IMUs), accelerometers, and gyroscopes. The IMU is configured to measure and report the velocity, acceleration, angular momentum, speed of translation, speed of rotation, and other telemetry metadata of devices 702 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 712 may be implemented as computing hardware and software configured to enable devices 702 to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 712 may be a two-way communication transceiver 712.

In an embodiment, the tracking module 714 may be implemented by combining the capabilities of the IMU, accelerometers, and gyroscopes with the positional tracking provided by the transceivers 712 and the accurate tracking, low-latency and high QOS functionalities provided by mmW-based antennas may enable sub-centimeter or sub-millimeter positional and orientational tracking, which may increase accuracy when tracking the real-time position and orientation of devices 702. In alternative embodiments, the sensing mechanisms and transceivers 712 may be coupled together in a single tracking module device.

The network interface 716 may be implemented as computing software and hardware to communicatively connect to a network, receive computer readable program instructions from the network sent by the server or by device 702, and forward the computer readable program instructions for storage in the memory 708 for execution by the processor 718.

The processor 718 may be implemented as computing hardware and software configured to receive and process data. For example, the processor 718 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 718 may receive user input data from I/O module 704 and may respectively implement application programs stored in the memory 708. In other examples, the processor 718 may receive data from sensing mechanisms captured from the real world, or may receive an accurate position and orientation of devices 702 through the tracking module 714, and may prepare some of the data before sending the data to a server for further processing. As way of example, the processor 718 may realize some of the steps required during data preparation including analog or digital signal processing algorithms such as raw data reduction or filtering of data before sending the data to a server.

Figure 8:
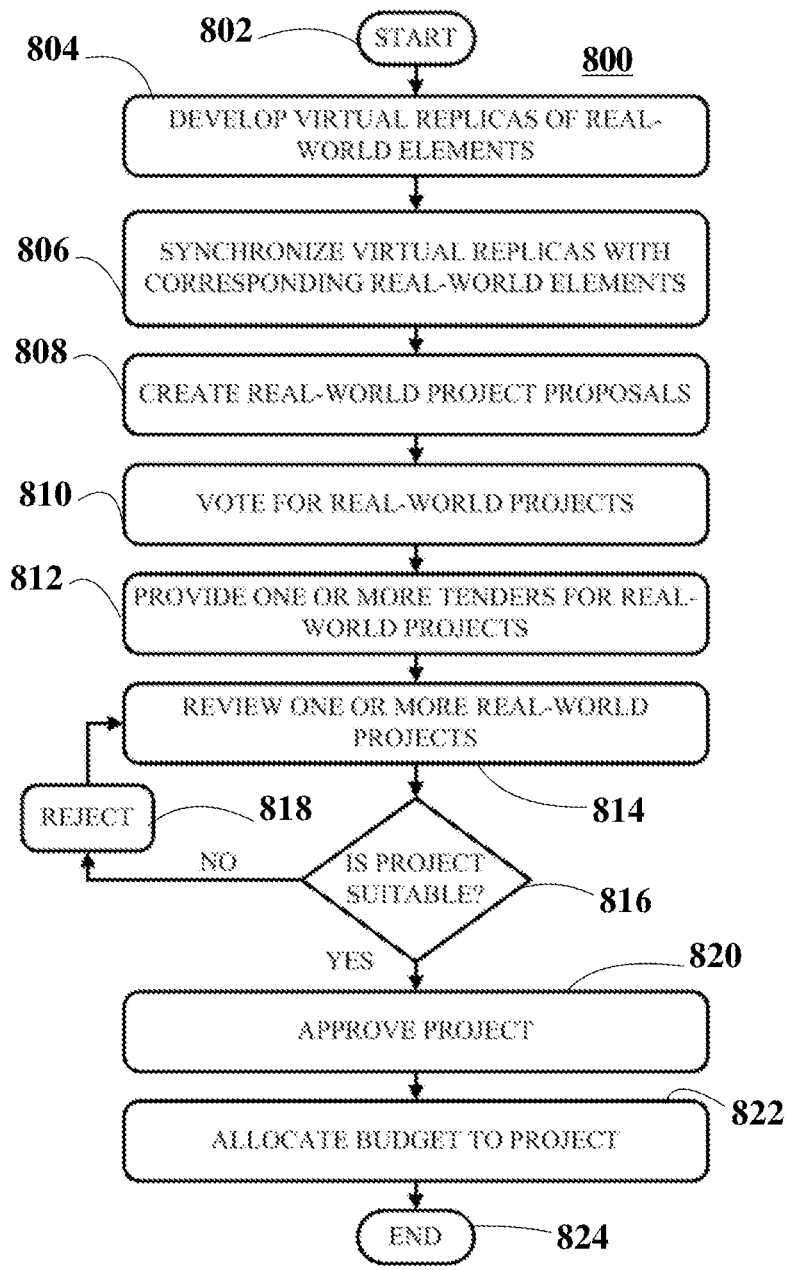
FIG. 8 depicts a block diagram of a method for virtual collaborative creation of real-world projects, according to an embodiment.

FIG. 8 depicts a block diagram of a method 800 for providing a virtual collaborative creation of real-world projects, according to an embodiment. Method 800 may be implemented by a system, such as systems described with reference to FIGS. 1-7.

Method 800 begins in blocks 802 and 804 by developing, via a replica editor, virtual replicas of real-world elements, generating a persistent virtual world system that is stored in a server. Method 800 continues in block 806 by synchronizing, via sensing mechanisms, the virtual replicas with the real-world elements and subsequently in block 808 by creating, via a collaborative creation platform stored in the server, one or more real-world project proposals in the form of virtual projects that are stored in a project database stored in the memory of the server. Each of the virtual projects corresponding to project proposals may include assets, which may either be selected from pre-defined assets or by modeling new assets, that represent each of the project proposals. In some embodiments, the predefined assets may include predefined materials included in corresponding dynamic bills of materials stored in the project database along with estimated costs. The bills of materials may be adjusted automatically by retrieving data from the project database and executing computer-readable instructions via the processor that generates the adjusted bills of materials and corresponding costs. In other embodiments, users may be able to edit the materials and costs according to their needs.

Method 800 continues in block 810 by voting (or instructing one or more computing devices to present user interfaces disclosed herein for receiving votes) for real-world projects via the collaborative creation platform. In some embodiments, the users may also view the voting scores of each project. Method 800 continues in block 812 by providing, by construction service providers via the collaborative tender platform stored in the server, one or more tenders (or instructing one or more computing devices to present user interfaces disclosed herein for receiving tenders) to each real-world project proposal. The tenders may include the estimated time and budget proposed for each selected project. In other embodiments, the tenders may additionally include a breakdown of materials required to perform the projects. In block 814, method 800 continues by reviewing, by city administrators via the collaborative administrative platform (or instructing one or more computing devices to present user interfaces disclosed herein for reviewing), one or more real-world projects. When reviewing the projects, the city administrators may be able to view the various projects along with the voting scores and the one or more tenders assigned to each project.

In check 816, the method 800 continues by a city administrator checking (or instructing one or more computing devices to automatically check) whether a project is suitable or not based on a rule-based system, such as by verifying the economic or geographical feasibility of the project, the actual need of the project, the voting scores, the materials required, and the like. If the project is not suitable, the city administrator may proceed by rejecting the project via the collaborative administrative platform (or one or more computing devices may be instructed to automatically reject the project), as viewed in block 818, and going back to block 814 by continuing to review other projects. If the project is suitable, the city administrator may proceed by approving the project (or one or more computing devices may automatically approve the project based on pre-defined criteria), as viewed in block 820.

Finally, the city administrator may end by allocating a budget to the project via the collaborative administrative platform (or one or more computing devices may be instructed to automatically allocate budget), as viewed in block 822. The budget may be assigned for the use of the project creator or the construction service provider. Method 800 may then end in block 824.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method for virtual collaborative creation of real-world projects, the method comprising:
by a server system comprising one or more server computers:
providing a persistent virtual world system including a replica editor and virtual replicas of real-world elements that are created using the replica editor;
synchronizing the virtual replicas with the real-world elements using multi-source data captured by sensors of connected devices in communication with the server system;
providing a collaborative creation platform stored in the server system, which enables creation of one or more virtual projects in the persistent virtual world system representing one or more real-world project proposals and enables voting on the one or more real-world project proposals, wherein the collaborative creation platform is configured to interface with client devices and to enable users of the client devices to select assets representing the virtual projects in the persistent virtual world system via a user interface in merged reality or virtual reality and to add the assets to at least one of the virtual projects, wherein corresponding virtual replicas of the assets are configured to be placed in desired locations in a 3D virtual space of the one or more virtual projects, wherein the desired locations correspond to real-world locations, and wherein the collaborative creation platform is further configured to provide the users with access to the virtual projects in the persistent virtual world system, to present separate graphical interface elements for voting for each of the assets in the 3D virtual space, the graphical interface elements for voting being co-located with the corresponding assets in the 3D virtual space, and to receive votes from the users for preferred virtual projects in the persistent virtual world system via the user interface by detecting user interaction with the graphical interface elements in the 3D virtual space, and to store the received votes of the users in a project database;
providing a collaborative tender platform stored in the server system, which enables providing one or more tenders to the one or more real-world project proposals; and
providing a collaborative administrative platform in the server system, which enables reviewing, approving or rejecting, and allocating budgets for the one or more real-world project proposals, wherein the collaborative administration platform is configured to present graphical interface elements with tender information in the 3D virtual space for each of the assets being voted on along with voting results information for each of the assets being voted on.

2. The method of claim 1, wherein the replica editor comprises modeling tools that enable generating virtual replicas with data and instructions based on CAD models of the real-world elements, the modeling tools enabling inputting building information models.

3. The method of claim 2, wherein the modeling tools further enable a car or drone-based image-scanning pipeline to be input through photo, video, depth measurements, simultaneous location and mapping (SLAM) scanning, or radar-imaging techniques, or combinations thereof, in order to model the virtual replicas.

4. The method of claim 1, wherein the collaborative platforms enable implementation of recommender systems for providing ranking and filtering of the proposed real-world projects to users through collaborative filtering or simulated filtering.

5. The method of claim 4, wherein the simulated filtering includes running goal-based simulations to obtain simulation results and comparing the simulation results with one or more aspects of the proposed real-world projects.

6. The method of claim 5, wherein the goal-based simulations are based at least in part on the multi-source data captured from the real-world elements.

7. A system for virtual collaborative creation of real-world projects, the system comprising:
a server system comprising one or more server computers including a memory and a processor, wherein the server system comprises a database with structured data storing virtual replicas of real-world elements forming a persistent virtual world system, wherein the virtual replicas are developed via a replica editor stored in the server system, the server system further storing collaborative platforms comprising a collaborative creation platform, a collaborative tender platform, a collaborative administration platform, and a project database configured to store project data; and
a plurality of connected devices connected to the server system via a network, each connected device comprising communication circuitry and one or more sensors, wherein the plurality of connected devices is configured to capture multi-source data from real-world elements using the one or more sensors, wherein the captured multi-source data serves to enrich the virtual replicas and synchronize the virtual replicas with corresponding real-world elements; and
wherein the collaborative creation platform enables creation of virtual projects in the persistent virtual world system representing proposed real-world projects, wherein the virtual projects include one or more of the virtual replicas of the real-world elements, wherein the collaborative tender platform enables providing tenders for the proposed real-world projects, and wherein the collaborative administration platform enables review of the proposed real-world projects,
wherein the collaborative creation platform is configured to interface with client devices and to enable users of the client devices to select assets representing the virtual projects in the persistent virtual world system via a user interface in merged reality or virtual reality and to add the assets to at least one of the virtual projects, wherein corresponding virtual replicas of the assets are configured to be placed in desired locations in a 3D virtual space of the one or more virtual projects, wherein the desired locations correspond to real-world locations, and
wherein the collaborative creation platform is further configured to provide the users with access to the virtual projects in the persistent virtual world system, to present separate graphical interface elements for voting for each of the assets in the 3D virtual space, the graphical interface elements for voting being co-located with the corresponding assets in the 3D virtual space, and to receive votes from the users for preferred virtual projects in the persistent virtual world system via the user interface by detecting user interaction with the graphical interface elements in the 3D virtual space, and to store the received votes of the users in the project database, and
wherein the collaborative administration platform is configured to present graphical interface elements with tender information in the 3D virtual space for each of the assets being voted on along with voting results information for each of the assets being voted on.

8. The system of claim 7, wherein the replica editor comprises modeling tools that enable generating virtual replicas with data and instructions based on CAD or CAE models of the real-world elements, the modeling tools enabling inputting building information models.

9. The system of claim 8, wherein the modeling tools further enable a car or drone-based image-scanning pipeline to be input through photo, video, depth measurements, simultaneous location and mapping (SLAM) scanning, or radar-imaging techniques, or combinations thereof in order to model the virtual replicas.

10. The system of claim 7, wherein the corresponding virtual replicas of the assets are configured to be modified via the user interface.

11. The system of claim 7, wherein the collaborative platforms enable implementation of recommender systems for providing ranking and filtering of the proposed real-world projects to users through collaborative filtering or simulated filtering.

12. The system of claim 11, wherein the simulated filtering includes running goal-based simulations to obtain simulation results and comparing the simulation results with existing proposed projects matching the simulation results in order to provide goal-based project recommendations.

13. The system of claim 12, wherein the goal-based simulations are based at least in part on the captured multi-source data from the real-world elements.

14. A non-transitory computer-readable medium having stored thereon instructions configured to cause a server system to perform steps comprising:
providing a persistent virtual world system including a replica editor and virtual replicas of real-world elements that are created using the replica editor;
synchronizing the virtual replicas with the real-world elements using multi-source data captured by sensors of connected devices in communication with the server system;
providing a collaborative creation platform stored in the server system, which enables creation of one or more virtual projects in the persistent virtual world system representing one or more real-world project proposals, wherein the collaborative creation platform is configured to interface with client devices and to enable users of the client devices to select assets representing the virtual projects in the persistent virtual world system via a user interface in merged reality or virtual reality and to add the assets to at least one of the virtual projects, wherein corresponding virtual replicas of the assets are configured to be placed in desired locations in a 3D virtual space of the one or more virtual projects, wherein the desired locations correspond to real-world locations, and wherein the collaborative creation platform is further configured to provide the users with access to the virtual projects in the persistent virtual world system, to present separate graphical interface elements for voting for each of the assets in the 3D virtual space, the graphical interface elements for voting being co-located with the corresponding assets in the 3D virtual space, and to receive votes from the users for preferred virtual projects in the persistent virtual world system via the user interface by detecting user interaction with the graphical interface elements in the 3D virtual space, and to store the received votes of the users in a project database; and providing a collaborative administrative platform in the server system, which enables reviewing, approving or rejecting, and allocating budgets for the one or more real-world project proposals, wherein the collaborative administration platform is configured to present graphical interface elements with tender information in the 3D virtual space for each of the assets being voted on along with voting results information for each of the assets being voted on.

15. The non-transitory computer-readable medium of claim 14, wherein the replica editor comprises modeling tools that enable generating virtual replicas with data and instructions based on CAD models of the real-world elements, the modeling tools enabling inputting building information models.

* * * * *